Oct. 22, 1935.  W. L. PRINCE  2,018,189

AUTO TIRE

Filed April 1, 1935

Inventor
William L. Prince,
By H. M. Plaisted,
Attorney

Patented Oct. 22, 1935

2,018,189

UNITED STATES PATENT OFFICE 2,018,189

AUTO TIRE

William L. Prince, Belleville, Ill.

Application April 1, 1935, Serial No. 14,044

1 Claim. (Cl. 152—13)

This invention relates to certain new and useful improvements in auto tires, the peculiarities of which will be hereinafter fully described and claimed.

This invention relates to that class of auto tires having inner tubes and enclosing casings, and distended by compressed air under working conditions. It is known that auto wheel tires travelling at present day high speeds, develop high internal heat which tends to cause the rubber fabric of the casing to separate and form blisters which enlarge till the tire blows out and may cause a dangerous accident.

One object of my present invention is to dissipate such internal heat and ventilate the tire; another object is to close the ventilating openings when in contact with the ground; another object is to minimize the danger of puncture of the inner tube and to cushion it; and another object is to provide a relatively cheap construction.

Figures 1, 2:
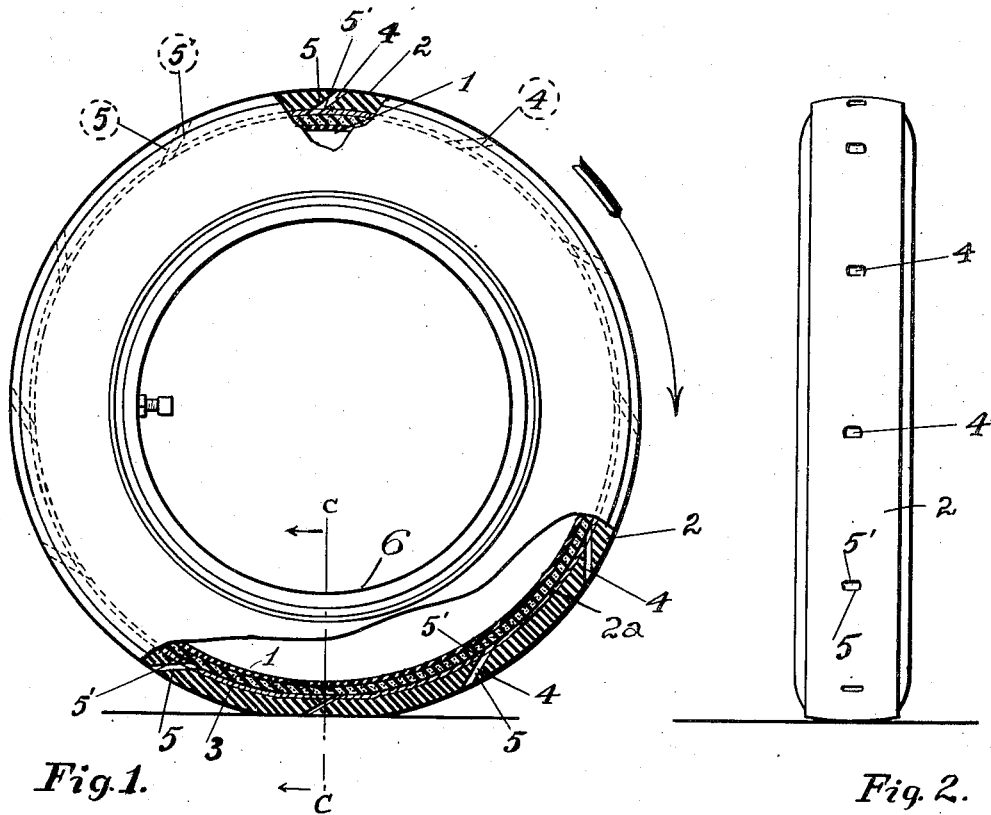
Figures 3, 4:
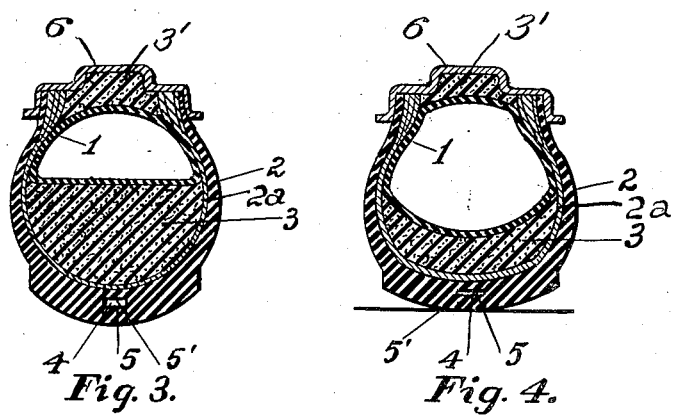

In the accompanying drawing in which like reference numerals indicate corresponding parts, Fig. 1 represents a side elevation of an auto wheel tire in ground contact and partly in section;

Fig. 2, a front view of the same;

Fig. 3, an enlarged transverse sectional view of the same showing the inner tube deflated and a sponge rubber ventilating cushion interposed between the tube and tread portion of the casing; and Fig. 4, a similar sectional view on C—C showing the inner tube inflated and said cushion in a compressed condition.

Referring to the drawing numeral 1 designates the usual or any approved type of inner tube which is filled with compressed air under working conditions. Enclosing said tube in the usual manner, is a casing 2, the peculiarities of which will be hereinafter described. Interposed within the inner tube and casing is a section of sponge rubber, 3, semi-circular in form when introduced into the casing as shown in Fig. 3, and compressed to a crescent shape when subject to the outward pressure of the distended inner tube (Fig. 4). This sponge rubber forms a circular cushion, and may be of other cellular material having elastic walls and forming air passages or interconnected spaces whereby circulation of air takes place in its more or less compressed condition. Since heat is generated inside the tire under high speed of rotation, and blisters are thus formed by the separation of the rubber and fabric 2a of the tire with consequent danger of serious accidents from blow-outs, I provide for the ejection of such heated air and the introduction of atmospheric air to the said air passages in the sponge rubber cushion, by the valvular openings 4 preferably located in the tread of the casing. These openings are slanting as they pass through the casing and communicate with the cushion to ventilate the latter. This slanting or inclined direction of the openings 4 is approximately 30 degrees to a tangent at the surface of the casing, and preferably inclined inward and backward relative to the rotation of the tire in actual use. They thus form overlapping tongues 5—5' at the outer and inner surface of said casing, and due to the inclination these tongues thin out. On account of the elasticity of the casing, contact with the ground and weight of the auto, will substantially close each opening successively.

The cellular passages, being directly in communication with the outside of the inner tube and the inside of the casing, the heat generated is dispersed from these surfaces and throughout the cushion, and is replaced by outside air with consequent cooling action.

This practical closing of each opening as it reaches the ground and the weight of the machine somewhat compresses the casing, will force the air through the ventilating cushion and outward through adjacent openings in the tread not in contact with the ground. This inward pressure from ground contact and compression of the ventilating cushion adjacent distributes the air in the cushion passages by the reactionary outward pressure of the compressed air of the inner tube.

One or more series of these valvular openings in the tread of the casing, spaced a suitable distance apart (6 inches or so) and successively coming into contact with the ground and subject to the compressive weight of the machine, will thus distribute the inner heat caused by high speeds, throughout the ventilating cushion and tire, and also eject the most of the internal hot air and so cool the remaining portion of said air that it is not harmful to the tire.

As indicated in the drawing, these valvular openings in the tread oppose the air in the direction the wheel rotates. Thus they tend to scoop in the atmospheric air, especially those at the top of the tire which is travelling at that instant faster than any portion of the tire. The air thus scooped up passes into the ventilating cushion passages and assists in driving out the heated air through other openings, which are normally open. A continuous circulation of air through the ventilating cushion is thus effected and consequent benefit by the removal of internal heat from the high speeding tire, is obtained.

Another function of the ventilated cushion is the added protection from punctures that it provides for the inner tube. When the cushion is compressed as in the working condition indicated in Fig. 4, the inner tube is separated about one inch from the tread portion of the casing, depending on the amount of air pressure in the inner tube, and a nail puncturing the casing is less liable to puncture the inner tube, than if the latter were in close contact with the casing as in the usual construction.

I preferably provide an annular cushion 3' of sponge rubber between the rim 6 and the inner tube also, as shown in Figs. 3 and 4, to avoid possible pinching of the inner tube, or abrasion from the rim.

The above described ventilating cushion, also functioning as a protective layer from the danger of puncture, is of relatively cheap material and avoids any metal or similar material adding considerable weight and cost to the manufacture of such tires.

I do not confine myself to the exact construction herein shown and described, except by the appended claim.

I claim:

An auto tire having in combination, an inner tube under air pressure, a tire casing, and an interposed elastic cushion having cellular walls forming multiple inter-connected communicating air passages in direct communication with the outer walls of the inner tube and the inner walls of the casing and also throughout said cushion and effecting dispersion of heat therefrom by circulation of air in the more or less compressed condition of the cushion, the tread of said casing having openings inclined inward substantially 30 degrees to a tangent at the surface forming tapering overlapping tongues at the respective outer and inner surfaces of the casing substantially closing said openings when subject to ground pressure and forming valvular openings supplying outside air to said passages in the cushion and displacing heated air therein, substantially as described.

WILLIAM L. PRINCE.